(12) United States Patent
Yoshida et al.

(10) Patent No.: US 10,546,140 B2
(45) Date of Patent: Jan. 28, 2020

(54) LEAKAGE PREVENTION APPARATUS, LEAKAGE PREVENTION METHOD AND PROGRAM

(71) Applicant: NIPPON TELEGRAPH AND TELEPHONE CORPORATION, Chiyoda-ku (JP)

(72) Inventors: Reo Yoshida, Musashino (JP); Hitoshi Fuji, Musashino (JP); Tetsutaro Kobayashi, Musashino (JP); Junya Akiba, Musashino (JP); Tomoaki Washio, Musashino (JP); Tsuyoshi Miyamoto, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 232 days.

(21) Appl. No.: 15/543,110

(22) PCT Filed: Jan. 14, 2016

(86) PCT No.: PCT/JP2016/050988
§ 371 (c)(1),
(2) Date: Jul. 12, 2017

(87) PCT Pub. No.: WO2016/114349
PCT Pub. Date: Jul. 21, 2016

(65) Prior Publication Data
US 2017/0372086 A1 Dec. 28, 2017

(30) Foreign Application Priority Data
Jan. 16, 2015 (JP) .................................. 2015-007034

(51) Int. Cl.
*G06F 21/62* (2013.01)
(52) U.S. Cl.
CPC ...... *G06F 21/62* (2013.01); *G06F 2221/2141* (2013.01)

(58) Field of Classification Search
CPC ...... G06F 21/62; G06F 21/60; G06F 21/6218; H04L 63/0428; H04L 63/1416
See application file for complete search history.

(56) References Cited

U.S. PATENT DOCUMENTS

| | | | |
|---|---|---|---|
| 6,523,118 B1 * | 2/2003 | Buer | G06F 21/71 380/28 |
| 8,726,396 B1 | 5/2014 | Dodke | |

(Continued)

FOREIGN PATENT DOCUMENTS

CN 1467642 A 1/2004

OTHER PUBLICATIONS

Extended European Search Report dated May 4, 2018 in Patent Application No. 16737420.6 citing references AA-AF therein, 8 pages.

(Continued)

*Primary Examiner* — Carl G Colin
*Assistant Examiner* — Vance M Little
(74) *Attorney, Agent, or Firm* — Oblon, McClelland, Maier & Neustadt, L.L.P.

(57) ABSTRACT

A leakage prevention apparatus stores an assumed use permission range, stores an information asset caused to be in an unavailable state by encryption, stores an information asset caused to be in an available state by decryption, and stores an information asset caused to be in a leakage-concerned state. When use of an information asset in the unavailable state is requested by an application corresponding to the use permission range, the information asset is decrypted to cause the information asset to be in the available state. When the use of the information asset in the available state by the application ends, the information asset is encrypted to cause the information asset to be in the unavailable state. When use of an information asset in the (Continued)

unavailable state is requested by an application not corresponding to the use permission range, the information asset is caused to be in the leakage-concerned state.

10 Claims, 2 Drawing Sheets

(56) References Cited

U.S. PATENT DOCUMENTS

| | | | |
|---|---|---|---|
| 8,893,223 B1 | 11/2014 | Dodke | |
| 8,898,779 B1 | 11/2014 | Jaiswal | |
| 2004/0010701 A1 | 1/2004 | Umebayashi et al. | |
| 2011/0185401 A1* | 7/2011 | Bak | G06F 16/9024 726/5 |
| 2011/0191862 A1* | 8/2011 | Mandava | H04W 12/08 726/28 |
| 2013/0269032 A1* | 10/2013 | Chasko | H04L 63/06 726/23 |
| 2014/0019753 A1* | 1/2014 | Lowry | H04L 63/062 713/155 |
| 2014/0230057 A1* | 8/2014 | Berger | G06F 21/88 726/23 |
| 2014/0380057 A1 | 12/2014 | Shi et al. | |
| 2015/0143518 A1 | 5/2015 | Jaiswal | |

OTHER PUBLICATIONS

"All-in-One Information Leakage Prevention Measures—InterSafeILP," <http://www.elsi.co.jp/security/ilp/> Retrieved Jan. 9, 2015, with partial English translation, 7 pages.

"Information Leakage Prevention Solution 'HIBUN,'" Hitachi Solutions, Ltd., <http://www.hitachi-solutions.co.jp/hibun/sp/> Retrieved Jan. 9, 2015, with partial English translation, 3 pages.

"Permanent Protection of RMS/IRM Capable of Coping with Information Leakage Risk from Loophole," Microsoft Corporation, <http://www.microsoft.com/ja-jp/business/enterprise/ecc/article/rms1012_2.aspx> Retrieved Jan. 9, 2015, with partial English translation, 4 pages.

"Information Assets to be Protected/Way of Thinking Information Risk," Information Security Seminar 2004, Information-technology Promotion Agency, Japan, <http://ww.ipa.go.jp/files/000013297.pdf> Retrieved Jan. 9, 2015, with partial English translation, 100 pages.

"Operating system market share," Net Market Share, <http://www.netmarketshare.com/operating-system-market-share.aspx?gprid=10&gpcustomd=0> Retrieved Jan. 9, 2015, 2 pages.

T. Motoda, et al., "The TRX Traceability Platform," NTT Technical Journal, vol. 12, No. 7, 2014, with English translation, 13 pages.

"Cloud-managed-key Cryptographic Scheme as a Drastic Solution to Data Protection Issues in an Online Environment," Nippon Telegraph and Telephone Corporation, <http://www.htt.co.jp/news2012/1202/120210b.html> Retrieved Jan. 9, 2015, with English translation, 6 pages.

International Search Report dated Apr. 12, 2016 in PCT/JP2016/050988 filed Jan. 14, 2016.

Combined Chinese Office Action and Search Report dated Aug. 5, 2019 in Chinese Patent Application No. 201680005393.2 (with English translation), citing document AO therein, 19 pages.

* cited by examiner

LEAKAGE PREVENTION APPARATUS, LEAKAGE PREVENTION METHOD AND PROGRAM

TECHNICAL FIELD

This invention relates to a technique for preventing information leakage in the information communication field.

BACKGROUND ART

Conventionally, for example, InterSafeILP® (see Non-patent literature 1), HIBUN® (see Non-patent literature 2), Microsoft RMS/IRM® (see Non-patent literature 3) and the like exist as techniques for measures against information leakage. Though there are minor functional differences among these prior-art techniques, the techniques are common in being provided with a function of reducing a risk of occurrence of information leakage and a function of, in case of occurrence of information leakage, identifying a cause of the information leakage and improving a state as main functions.

PRIOR ART LITERATURE

Non-Patent Literature

Non-patent literature 1: Alps System Integration Co. Ltd., "All-in-One Information Leakage Prevention Measures—InterSafeILP", (online), (retrieved on Jan. 9, 2015), on the Internet (URL: http://www.alsi.co.jp/security/ilp/)

Non-patent literature 2: Hitachi Solutions, Ltd., "Information Leakage Prevention Solution 'HIBUN'", (online), (retrieved on Jan. 9, 2015), on the Internet (URL: http://www.hitachi-solutions.co.jp/hibun/sp/) Non-patent literature 3: Microsoft Corporation, "Permanent Protection of RMS/IRM Capable of Coping with Information Leakage Risk from Loophole", (online), (retrieved on Jan. 9, 2015), on the Internet (URL: http://www.microsoft.com/ja-jp/business/enterprise/ecc/article/rms1012_2.aspx)

SUMMARY OF THE INVENTION

Problems to be Solved by the Invention

In prior-art information leakage measure techniques, however, a function of detecting information leakage is not provided, and it is not possible to notice information leakage. For example, in order to detect that a file on a computer has been leaked, it is necessary to define a normal state for the file. However, it is not easy to realize it because there are too many states in which a file can be.

In view of such a point, an object of the present invention is to detect a state in which leakage of an information asset is concerned and prevent information leakage.

Means to Solve the Problems

In order to solve the above problem, a leakage prevention apparatus of this invention comprises: an assumed use permission range storing part storing an assumed use permission range specified in advance; an unavailable state storing part storing an information asset caused to be in an unavailable state by encryption; an available state storing part storing an information asset caused to be in an available state by decryption; a leakage-concerned state storing part storing an information asset caused to be in a leakage-concerned state; a state changing part decrypting the information asset in the unavailable state to cause the information asset to be in the available state when use of the information asset is requested by an application corresponding to the assumed use permission range, and encrypting the information asset in the available state to cause the information asset to be in the unavailable state when the use of the information asset by the application ends; and a state monitoring part causing the information asset in the unavailable state to be in the leakage-concerned state when use of the information asset is requested by an application not corresponding to the assumed use permission range.

Effects of the Invention

Since it is possible to detect a state in which leakage of an information asset is concerned, by a leakage prevention technique of this invention, it is possible to prevent information leakage. For example, by combining the leakage prevention technique with another network access restriction system such as an intrusion prevention system (IPS) or stopping decryption, it becomes possible to prevent leakage of an information asset outside.

DETAILED DESCRIPTION OF THE EMBODIMENT

Figure 1:
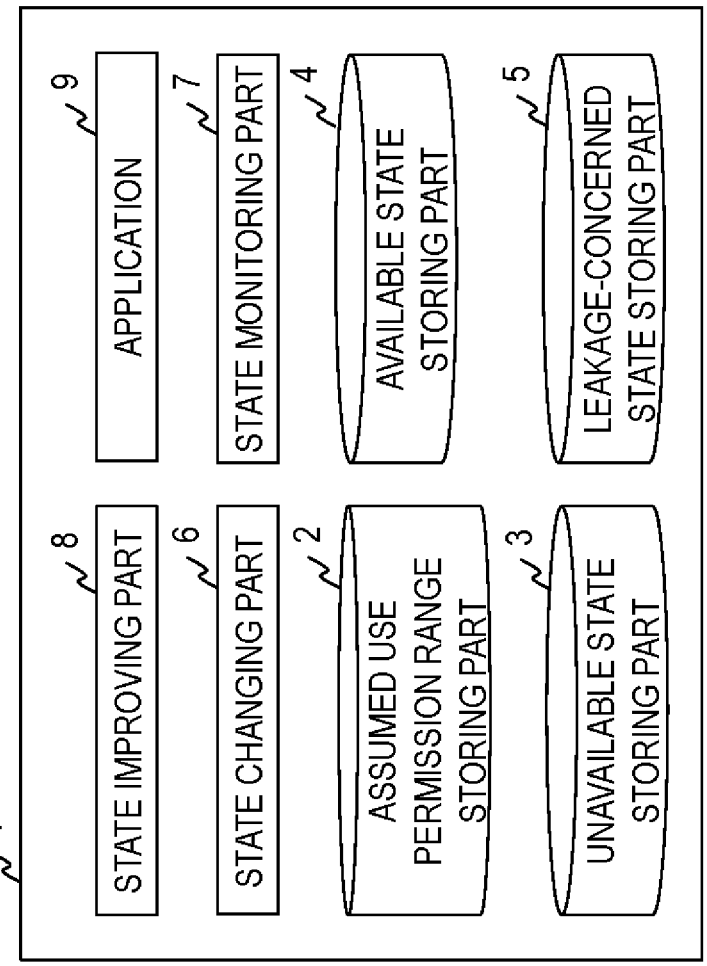
FIG. 1 is a diagram illustrating a functional configuration of a leakage prevention apparatus.

Prior to description of an embodiment, a basic way of thinking of this invention will be described.

According to Reference Literature 1 shown below, examples of information assets of a company include financial, personnel, client, strategy and technical information and the like. In an information system of a company, these information assets exist as various media. The media of information assets include, for example, hardware such as a personal computer, an optical disk and a magnetic tape and software such as electronic data.

<Reference Literature 1> Independent administrative agency, Information-technology Promotion Agency, Japan, "Information Assets to be Protected/Way of Thinking Information Risk", Information Security Seminar 2004, (online), (retrieved on Jan. 9, 2015), on the Internet (URL: https://www.ipa.go.jp/files/000013297.pdf)

According to Reference Literature 2 shown below, as for market shares of operating systems (OS), Windows® of Microsoft Corporation accounts for 90% (as of December 2014), and, therefore, it can be thought that terminals for handling information assets to perform work are generally desktop computers and laptop computers equipped with Windows OS.

<Reference Literature 2> Net Applications, "Operating system market share", (online), (retrieved on Jan. 9, 2015), on the Internet (URL: http://www.netmarketshare.com/operating-system-market-share.aspx?qprid=10&qpcustomd=0)

Since the smallest data unit in GUI (Graphical User Interface) is a file in Windows OS, it can be said that information assets in files are held in some form in a company. Therefore, in this invention, on an assumption of a situation in which information assets exist as electronic files on OS having GUI, such as Windows OS, information leakage measures therefor will be considered.

A basic idea of this invention is to reveal a leakage-concerned state as a state more significant than an abnormal state after leakage of an information asset, by strictly defining a normal state of the information asset. In other words, the leakage-concerned state is a state in which an information asset internally exists but exists outside an assumed use permission range. If an information asset in this state is leaked outside, it is information leakage. By finding the leakage-concerned state, it becomes possible to prevent or early find information leakage. Further, if the leakage-concerned state can be found, it becomes possible to implement improvement measures before an information asset is leaked outside by taking measures such as causing use of the information asset in a terminal by a certain user to be stopped.

In order to define a normal state, it is necessary to define an assumed use permission range for an information asset. Here, electronic things are targeted by the assumed use permission range. This is because an effect of early adjusting and certainly realizing improvement measures is high. Examples of the assumed use permission range electronically defined include access control for each person or organization based on identification such as a mail address, terminal control, restriction of use by an application, and the like. In order to certainly implement restriction of use, it is common to introduce a system which requires authentication at the time of use, such as IRM (Information Rights Management). Furthermore, by encrypting basically all information assets to cause the information assets to be unavailable, a process capable of performing state change from the unavailable state to the available state (that is, decryption) is limited, and definition of a normal state is facilitated.

A more detailed description will be made below on three functions of leakage prevention, leakage detection, and leakage cause identification and improvement. Though the description will be made on information leakage from an auxiliary storage device on an assumption that information leakage from a central processing unit or a main memory does not occur, the present invention is not limited thereto.

<Leakage Preventing Function>

It is assumed that all information assets are basically in the unavailable state. Only one application capable of changing the unavailable state to the available state (hereinafter referred to as a state changing AP) exists, and the state changing AP does not have a function of using the information assets (for example, browsing, editing and the like). An assumed use permission range within which the unavailable state can be changed to the available state is electronically defined, and authentication is necessarily requested in order to change the state. When an information asset is caused to be in the available state by the state changing AP, an application capable of using the information asset (hereinafter referred to as a using AP) is defined. The information asset used by the using AP is necessarily caused to be in the unavailable state by the state changing AP after the use ends.

<Leakage Detecting Function>

When access to an information asset which is in the unavailable state from an application other than the state changing AP occurs, all of the information asset is defined to be in the leakage-concerned state. When access to an information asset which are in the available state from an application other than a specified using AP occurs, all of the information asset is caused to be in the leakage-concerned state. When an information asset the use of which by a using AP has ended does not change into the unavailable state, all of the information asset is caused to be in the leakage-concerned state.

<Cause Identifying and Improving Function>

By causing an information asset which has changed into the leakage-concerned state and a user or terminal that has caused the leakage-concerned state to be displayed, when, where and which information asset has been leaked is identified. By nullifying state changing authority of the user or terminal that has caused the information asset to be in the leakage-concerned state, the assumed use permission range is adjusted and improved.

An embodiment of this invention will be described below in detail. In drawings, components having the same function will be given the same reference numeral, and redundant description will be omitted.

A leakage prevention apparatus 1 of the embodiment comprises, for example, an assumed use permission range storing part 2, an unavailable state storing part 3, an available state storing part 4, a leakage-concerned state storing part 5, a state changing part 6, a state monitoring part 7, a state improving part 8 and an application 9 as shown in FIG. 1. There may be a plurality of applications 9, or the application 9 may exist in another apparatus connected via an existing network.

The leakage prevention apparatus 1 is, for example, a special apparatus configured by a special program being read into a publicly known or dedicated computer having a central processing unit (CPU), a main memory (RAM: Random Access Memory) and the like. The leakage prevention apparatus 1, for example, executes each process under control of the central processing unit. Data inputted to the leakage prevention apparatus 1 and data obtained by each process are stored, for example, in the main memory, and the data stored in the main memory is read and used for other processes when necessary. Further, at least a part of the processing parts of the leakage prevention apparatus 1 may be configured with hardware such as an integrated circuit.

The leakage prevention apparatus 1 of the present embodiment is assumed to be a desktop type or laptop type personal computer or a tower type or rack-mount type server computer equipped with Windows of Microsoft Corporation as an operating system (OS) but is not limited thereto.

Each of the storing parts comprised in the leakage prevention apparatus 1 is, for example, an auxiliary storage device configured with a semiconductor memory device like a hard disk, an optical disk or a flash memory. The storing parts comprised in the leakage prevention apparatus 1 may be configured with physically divided storage devices, respectively, or may be configured so as to be logically divided and stored in one physical storage device.

Assumed use permission ranges specified in advance are stored in the assumed use permission range storing part 2. The assumed use permission range is information defining whether or not to permit use of an information asset based on information such as a kind of an application, a user operating the application, and a terminal operating the application if the application requests access to the information asset via a network.

A plurality of information assets are stored in the unavailable state storing part 3, the available state storing part 4 and the leakage-concerned state storing part 5 for states in which the information assets can be, respectively. The information assets are, for example, electronic files in which various information used for corporate activities such as financial, personnel, client, strategy and technical information are recorded.

Access to the information assets stored in each storing part is continuously monitored by the state monitoring part 7. The state monitoring part 7 monitors input/output of files stored in each storing part and a system log recorded by the leakage prevention apparatus 1 in accordance with rules defined in advance. The state monitoring part 7 is, for example, a traceability platform described in Reference Literature 3 shown below. The traceability platform in Reference Literature 3 is in a client/server configuration, and the state monitoring part 7 is a traceability platform client. A file trace log generating function of a traceability platform client is capable of monitoring file input/output by an application operating on Windows and an event log and the like outputted by Windows. Further, it is possible to, by analyzing a log of a traceability platform client using a grouping function of a traceability platform server, grasp each of processes of opening, reading, writing and the like for each file. It is possible to, by detecting whether or not a file accessed by an application is in the unavailable state using this function, detect that an information asset in the unavailable state has changed into the leakage-concerned state. Furthermore, since it is possible to detect access to an information asset in the available state, it is possible to judge whether or not the access is from an application compatible with a file type of the information asset, and it is possible to find information leakage.

<Reference Literature 3> Toshihiro Motoda, Takeshi Nagayoshi, Junya Akiba, Kaku Takeuchi, "The TRX Traceability Platform" NTT Technical Journal, vol. 26(3), pp. 57-62, March 2014

Figure 2:
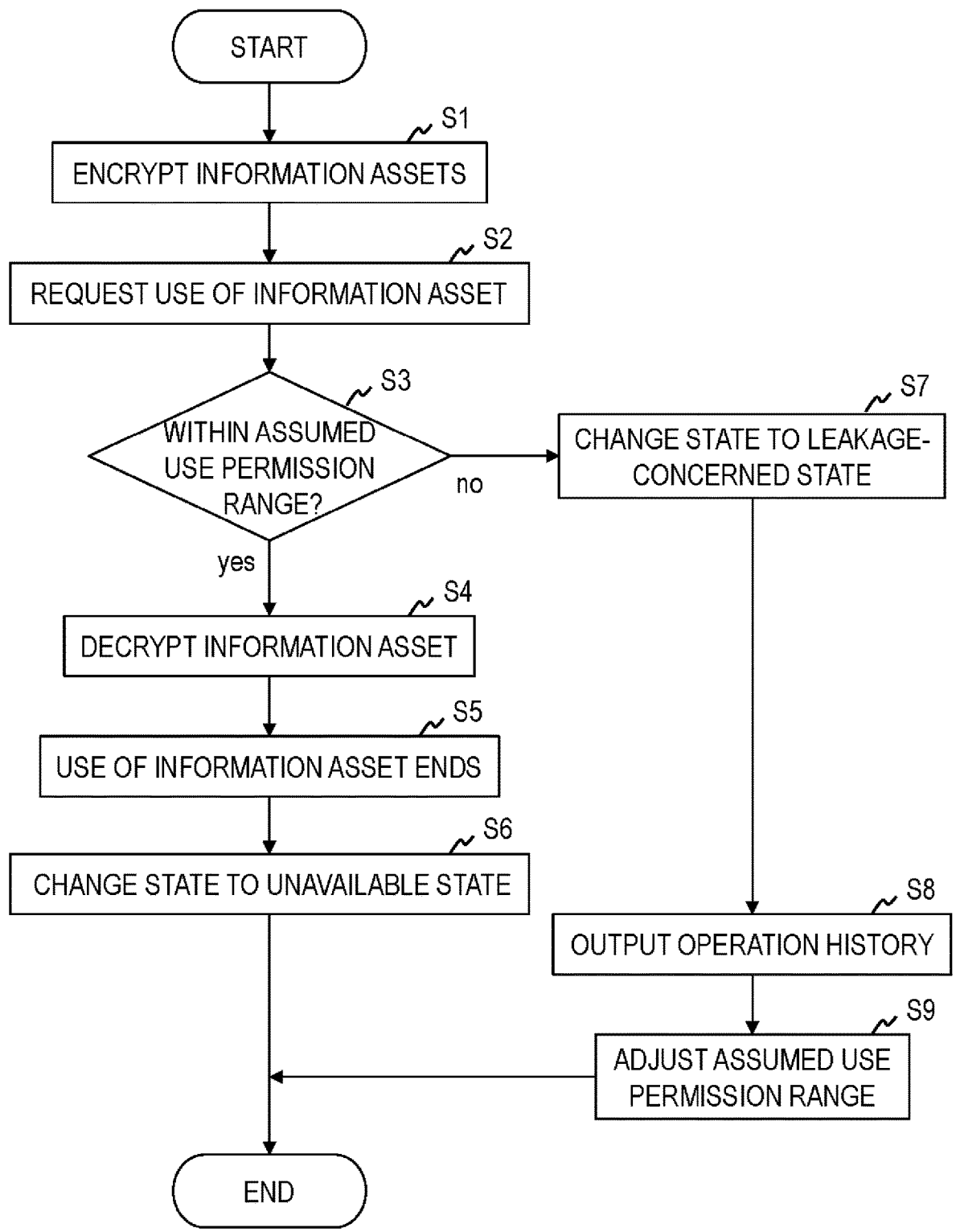
FIG. 2 is a diagram illustrating a process flow of a leakage prevention method.

A process procedure for a leakage prevention method of the embodiment will be described below with reference to FIG. 2.

At step S1, the state changing part 6 encrypts all information assets to cause the information assets to be in the unavailable state. Further, when a new information asset is newly added to a terminal from the application 9, the state changing part 6 encrypts the information asset to cause the information asset be in the unavailable state. The information asset caused to be in the unavailable state is stored into the unavailable state storing part 3. As an encryption system, for example, a cloud-managed-key cryptographic scheme described in Reference Literature 4 shown below is used. In the cloud-managed-key cryptographic scheme, by storing a decryption key on a cloud, authentication/approval is performed at the time of decryption, and only decryption authority is handed over to a client. At this time, it is possible to control the decryption authority for each user, each organization, each terminal and the like attempting to perform decryption. In the cloud-managed-key cryptographic scheme, since information about the decryption key is not handed over to the client at all, all encrypted information assets are basically in the unavailable state.

<Reference Literature 4> Nippon Telegraph and Telephone Corporation, "Cloud-managed-key Cryptographic Scheme" as a Drastic Solution to Data Protection Issues in an Online Environment", NTT Group Press Releases (online), (retrieved on Jan. 9, 2015), on the Internet (URL: http://www.ntt.co.jp/news2012/1202/120210b.html)

At step S2, the application 9 requests use of an information asset in the unavailable state stored in the unavailable state storing part 3 in response to a user's operation.

At step S3, the state changing part 6 judges whether or not the use request from the application 9 is for use corresponding to an assumed use permission range stored in the assumed use permission range storing part 2. Specifically, it is possible to judge whether or not the use is included within the assumed use permission range by confirming whether or not a user or terminal of the application corresponds to decryption authority set in advance using an authentication/approval function of cloud-managed-key cryptography. If it is judged that the use corresponds to the assumed use permission range, the process proceeds to step S4. If it is judged that the use does not correspond to the assumed use permission range, the process proceeds to step S7.

At step S4, the state changing part 6 decrypts the information asset in the unavailable state the use of which is being requested by the application 9 which corresponds to the assumed use permission range to cause the information asset to be in the available state. The decrypted information asset is temporarily recorded to the available state storing part 4, and the operation is handed over to the application 9.

At step S5, the application 9 performs a desired use operation for the information asset in the available state stored in the available state storing part 4. The use is a general file operation, for example, browsing and editing of information recorded in the file. Further, in a case where the application 9 exists in another terminal connected via a network, an operation of moving the file to the terminal is also included in the use operation. As for the information asset the use of which has ended, the application 9 hands over the operation to the state changing part 6.

At step S6, the state changing part 6 encrypts the information asset in the available state the use of which by the application 9 has ended to cause the information asset to be in the unavailable state. The information asset caused to be in the unavailable state is stored into the unavailable state storing part 3. At the same time, the information asset in the available state which is temporarily recorded in the available state storing part 4 is permanently deleted. Further, when the application 9 exists in another terminal, an information asset which has been moved to the terminal is deleted if any. If the information asset the use by the application 9 has ended does not change into the unavailable state due to some problem, the information asset is caused to be in the leakage-concerned state. The information asset caused to be in the leakage-concerned state is stored into the leakage-concerned state storing part 5.

At step S7, the state monitoring part 7 causes the information asset the use of which is requested by the application 9 which does not correspond to the assumed use permission range to be in the leakage-concerned state and stores the information asset into the leakage-concerned state storing part 5. On this occasion, the date and time of the access, the access target information asset, identification information identifying a user who is operating the application 9 (for example, a mail address or an account name) or identification information identifying a terminal which is operating the application 9 (for example, an IP address or a computer name), and the like are accumulated as an operation history. At this time, the operation history may be configured so as to be accumulated not only inside the leakage prevention apparatus 1 but also in an external log management server.

At step S8, the state improving part 8 outputs the operation history at the time when the information asset changed into the leakage-concerned state, in response to a user's operation. Specifically, a grouping function of a file operation event provided for the traceability platform is used. Thereby, it is possible to visualize the operation history for the information asset, and it is possible to trace when and where the information asset changed into the leakage-concerned state. For example, when an information asset of the application 9 was moved to another terminal, and use has not ended, it is possible to confirm which terminal the information asset has been taken out to.

At step S9, based on the assumed use permission range stored in the assumed use permission range storing part 2 and the operation history at the time when the information asset changed into the leakage-concerned state, the state improving part 8 adjusts the assumed use permission range. The adjusted assumed use permission range is stored into the assumed use permission range storing part 2. Specifically, by nullifying the decryption authority for the user or terminal which has performed the operation of causing the leakage-concerned state using the authentication/approval function of the cloud-managed-key cryptography, the assumed use permission range is adjusted. For example, when a predetermined or longer time has elapsed after the application 9 took out a certain information asset to a certain terminal, use of the information asset in the terminal can be stopped.

By making a configuration as described above, the leakage prevention technique of this invention strictly defines a normal state by encrypting all information assets to cause the information assets to be in the unavailable state, and detects the leakage-concerned state by monitoring access beyond an assumed use permission range. Further, by adjusting an assumed use permission range based on a history of an operation which has caused the leakage-concerned state, the state is improved before an information asset is leaked outside. Therefore, according to this invention, it is possible to detect a state in which leakage of an information asset is concerned and prevent information leakage.

This invention is not limited to the embodiment described above, and it goes without saying that it is possible to appropriately make a change within a range not departing from the spirit of this invention. The various processes described in the above embodiment are not only executed in order of the description. They may be executed in parallel or individually according to processing capacity of an apparatus to execute the processes or as necessary.

<Program and Recording Medium>

In a case of realizing the various processing functions of devices described in the above embodiment by a computer, processing content of a function which each device should have is written in a program. Then, by executing the program on the computer, the various processing functions of the devices described above are realized on the computer.

The program in which the processing content is written can be recorded in a computer-readable recording medium. As the computer readable recording medium, any recording medium, such as a magnetic recording apparatus, an optical disk, a magneto-optical medium and a semiconductor memory, is possible.

Further, distribution of this program is performed, for example, by sales, transfer, lending and the like of a portable recording medium such as a DVD and a CD-ROM in which the program is recorded. Furthermore, a configuration is also possible in which the program is stored in a storage device of a server computer and distributed by transferring the program from the server computer to other computers via a network.

For example, a computer which executes such a program stores the program recorded in the portable recording medium or transferred from the server computer into its storage device once. Then, at the time of executing a process, the computer reads the program stored in its recording medium and executes a process in accordance with the read program. Further, as another form of executing this program, it is also possible for the computer to directly read the program from the portable recording medium and execute the process in accordance with the program, and, furthermore, it is also possible for the computer to, each time a program is transferred to the computer from the server computer, execute a process in accordance with the received program in order. Further, a configuration is also possible in which the program is not transferred from the server computer to the computer, but the processes described above are executed by a so-called ASP (Application Service Provider) type service for realizing a processing function only by an instruction to execute the program and acquisition of a result. It is assumed that the program in the present embodiment includes information to be provided for processing by an electronic calculator and equivalent to a program (such as data which is not a direct instruction to a computer but has properties defining processing of the computer).

Further, though it is assumed in this embodiment that the present apparatus is configured by executing a predetermined program on a computer, at least a part of the processing content may be realized by hardware.

DESCRIPTION OF REFERENCE NUMERALS

1 leakage prevention apparatus
2 assumed use permission range storing part
3 unavailable state storing part
4 available state storing part
5 leakage-concerned state storing part
6 state changing part
7 state monitoring part
8 state improving part
9 application

What is claimed is:

1. A leakage prevention apparatus comprising:
   circuitry configured to:
   store an assumed use permission range specified in advance in an assumed use permission range storage;
   store an information asset caused to be in an unavailable state by encryption in an unavailable state storage;
   store an information asset caused to be in an available state by decryption in an available state storage;
   store an information asset caused to be in a leakage-concerned state in a leakage-concerned state storage;
   decrypt the information asset in the unavailable state to cause the information asset in the unavailable state to be in the available state when use of the information asset in the unavailable state is requested by an application corresponding to the assumed use permission range;
   encrypt the information asset in the available state to cause the information asset in the available state to be in the unavailable state when the use of the information asset in the available state by the application ends;
   cause the information asset in the unavailable state to be in the leakage-concerned state when use of the information asset in the unavailable state is requested by an application not corresponding to the assumed use permission range; and
   cause the information asset in the available state to be in the leakage-concerned state and store the information asset in the leakage-concerned state into the leakage-concerned state storage when the information asset in the available state used by the application does not change into the unavailable state after the use has ended.

2. The leakage prevention apparatus according to claim 1, wherein the circuitry accumulates information about the use request at the time of causing the information asset in the unavailable state to be in the leakage-concerned state, as an operation history.

3. The leakage prevention apparatus according to claim 2, wherein the circuitry further configured to adjust the assumed use permission range based on the assumed use permission range and the operation history.

4. The leakage prevention apparatus according to claim 3, wherein the circuitry judges whether or not the use request for the information asset in the unavailable state corresponds to the assumed use permission range by monitoring at least one of file input/output and a system log.

5. The leakage prevention apparatus according to any of claims 1 to 3, wherein the circuitry performs encryption and decryption using a cloud-managed-key cryptographic scheme in which a decryption key is managed on a cloud.

6. The leakage prevention apparatus according to claim 5, wherein the circuitry judges whether or not the use request for the information asset in the unavailable state corresponds to the assumed use permission range by monitoring at least one of file input/output and a system log.

7. The leakage prevention apparatus according to claim 2, wherein the circuitry judges whether or not the use request for the information asset in the unavailable state corresponds to the assumed use permission range by monitoring at least one of file input/output and a system log.

8. The leakage prevention apparatus according to claim 1, wherein the circuitry judges whether or not the use request for the information asset in the unavailable state corresponds to the assumed use permission range by monitoring at least one of file input/output and a system log.

9. A leakage prevention method comprising
by circuitry of a leakage prevention apparatus:
storing an assumed use permission range specified in advance in an assumed use permission range storage;
storing an information asset caused to be in an unavailable state by encryption in an unavailable state storage;
decrypting, when use of the information asset in the unavailable state is requested by an application corresponding to the assumed use permission range, the information asset in the unavailable state to cause the information asset in the unavailable state to be in an available state and storing the information asset in an available state into an available state storage;
encrypting, when the use of the information asset in the available state by the application ends, the information asset in the available state to cause the information asset in the available state to be in the unavailable state and storing the information asset in the unavailable state into an unavailable state storage; and
causing, when use of the information asset in the unavailable state is requested by an application not corresponding to the assumed use permission range, the information asset in the unavailable state to be in a leakage-concerned state and storing the information asset in a leakage-concerned state into a leakage-concerned state storage,
causing the information asset in the available state to be in the leakage-concerned state and storing the information asset in the leakage-concerned state into the leakage-concerned state storage when the information asset in the available state used by the application does not change into the unavailable state after the use has ended.

10. A non-transitory computer readable medium including computer executable instructions that make a leakage prevention apparatus perform a method comprising:
storing an assumed use permission range specified in advance in an assumed use permission range storage;
storing an information asset caused to be in an unavailable state by encryption in an unavailable state storage;
decrypting, when use of the information asset in the unavailable state is requested by an application corresponding to the assumed use permission range, the information asset in the unavailable state to cause the information asset in the unavailable state to be in an available state and storing the information asset in the available state into an available state storage;
encrypting, when the use of the information asset in the available state by the application ends, the information asset in the available state to cause the information asset in the available state to be in the unavailable state and storing the information asset in the unavailable state into an unavailable state storage;
causing, when use of the information asset in the unavailable state is requested by an application not corresponding to the assumed use permission range, the information asset in the unavailable state to be in a leakage-concerned state and storing the information asset in a leakage-concerned state into a leakage-concerned state storage; and
causing the information asset in the available state to be in the leakage-concerned state and storing the information asset in the leakage-concerned state into the leakage-concerned state storage when the information asset in the available state used by the application does not change into the unavailable state after the use has ended.

* * * * *